Jan. 23, 1968
KAZUO SUGIMURA
3,364,949
ACCUMULATORS OF PRESSURE LIQUID TYPE
Filed June 14, 1965
2 Sheets—Sheet 1
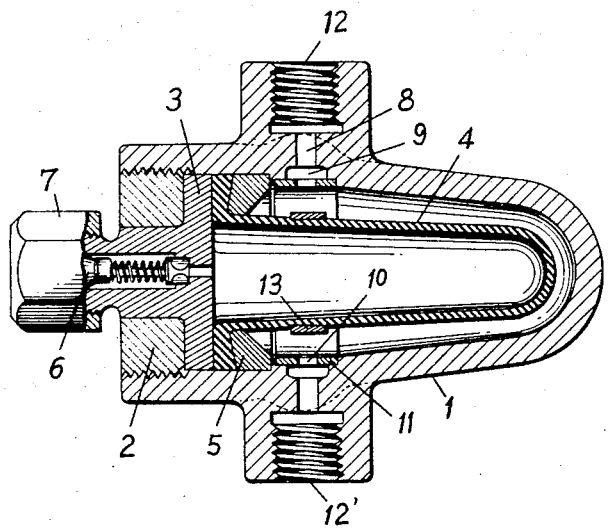
Fig. 1-a.
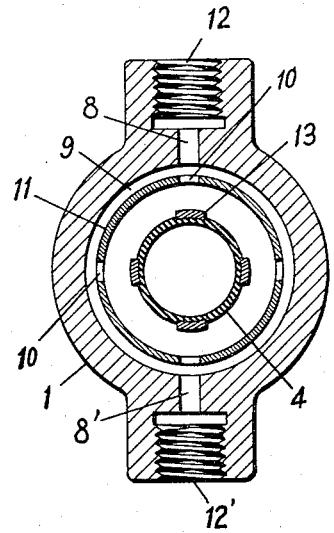
Fig. 1-b.
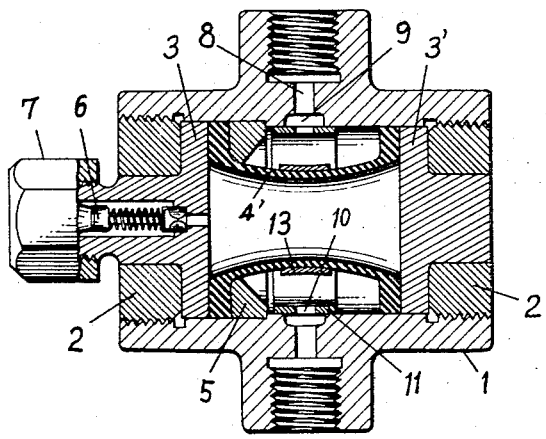
Fig. 2-a.
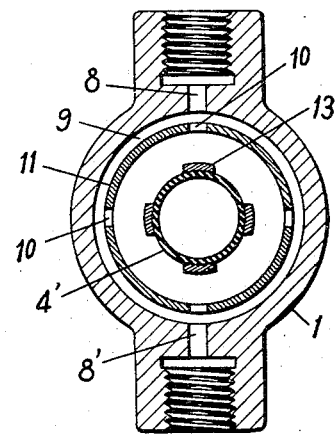
Fig. 2-b.
KAZUO SUGIMURA
INVENTOR
BY Gilbert J. Kramer Fig. 3-a. 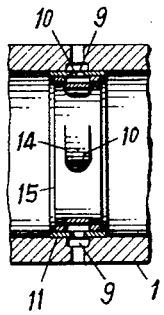
Fig. 3-b. 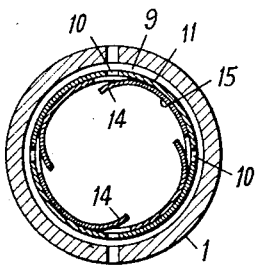
Fig. 4-a. 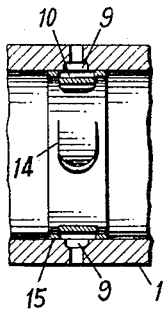
Fig. 4-b. 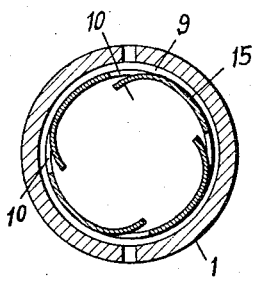
Fig. 5-a. 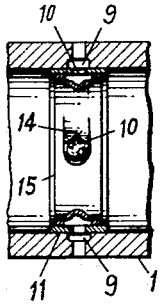
Fig. 5-b. 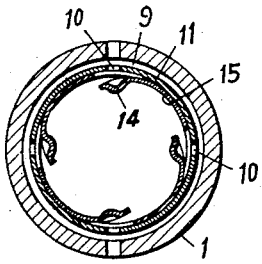
Fig. 6-a. 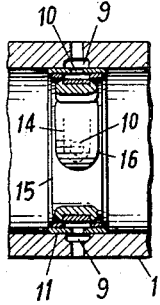
Fig. 6-b. 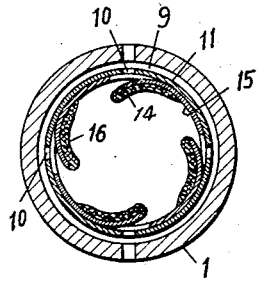
Fig. 7-a. 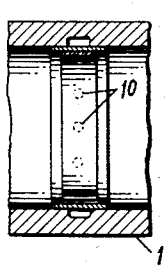
Fig. 7-b. 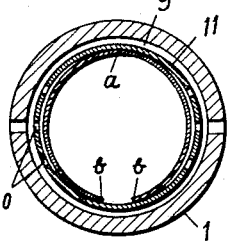
Fig. 8-a. 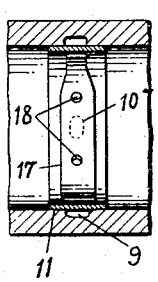
Fig. 8-b. 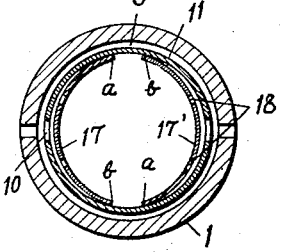
KAZUO SUGIMURA
INVENTOR United States Patent Office 3,364,949
Patented Jan. 23, 1968

3,364,949
ACCUMULATORS OF PRESSURE LIQUID TYPE
Kazuo Sugimura, Shimizu-shi, Japan (% Albert J. Kramer, 1000 Connecticut Ave. NW., Washington, D.C. 20036)
Filed June 14, 1965, Ser. No. 463,892
10 Claims. (Cl. 138—30)

ABSTRACT OF THE DISCLOSURE

A bladder type accumulator is provided in the form of a liquid tank having end walls and longitudinal side walls, a resiliently deformable bladder is held inside the tank in spaced relation to the side wall, an annular groove is provided on the inside of the side wall surrounding the bladder. This groove is covered by an annular ring which forms with the groove an annular channel. Diametrically opposite openings are provided in the ring for communicating the space between the bladder and the inner walls of the tank with the channel and additional openings are provided through the wall extending from the channel for tubular connections. Various alternative means are provided for preventing damage to the bladder in contact position with the openings, including (1) patches on the bladder, (2) an intermediate ring having various forms of inwardly projecting scroll-like resilient tongues, and (3) arcuate members adapted to be stressed into positions of closure relative to the openings. One specific means comprises the fabrication of the annular ring itself with closable resilient tonguelike members.

---

This invention relates to the improvement of accumulators of pressure liquid type, consisting of a pressure liquid tank of rigid material, and of a gas bag or a bladder of resilient deformable material, filled with gas under a certain standard pressure, and equipped within the pressure liquid tank.

It is well known that accumulators of this bladder type serves not only as a source of pressure liquid in a pressure hydraulic system, but also as an absorber of pump pulsations and hydraulic shocks which are induced in the system.

The gas bag, filled with gas under a certain standard pressure, expands or deflates according to the pressure change which would be induced in the hydraulic system, and thus, reduces the pressure change and absorbs pulsations and hydraulic shocks, and then the pressure of hydraulic system is controlled and kept to its regular and stable normal value.

But in the conventional accumulators of the bladder type, as the hydraulic system is connected through a liquid port equipped at one end of the longitudinal centre line of the liquid tank, all functions of the accumulator are performed through this single port. Thus the change of hydraulic pressure acts through this port at first on the gas bag at one of its longitudinal ends, then gradually this change propagates longitudinally all over along the longitudinal cylindrical wall of the gas bag, which plays the chief roll of shock absorbing, and consequently, it takes time for the gas bag to perform this function of shock absorbing.

Thus, one of the defects of the conventional bladder type accumulators is that the shock absorbing ability is not strong.

To eliminate this defect, the accumulator of this invention is provided with two or more liquid ports along the circumference of the longitudinal or cylindrical wall of pressure liquid tank, and radially against the longitudinal or cylindrical wall of the gas bag.

By this arrangement, hydraulic pressure change acts directly on the longitudinal or cylindrical wall of the gas bag uniformly along its circumference, and consequently it takes almost no time for the accumulator that the gas bag reacts against any pressure change or any hydraulic shock, induced in the hydraulic system. Because of this sensible characteristics against pressure change, it is actually proved that the accumulator of this invention serves as a far better shock absorber than the conventional.

The accompanying drawings show one or more of various possible embodiments of the several features of the invention.

In the drawings:

FIG. 1a and FIG. 1b are respectively the longitudinal and cross section of an accumulator of pot type; FIG. 2a and FIG. 2b are respectively the longitudinal and cross section of an accumulator of cylinder type. The difference between the two types is that the oil tank 1 of the former is of a pot shape, while the oil tank 1' of the latter is of a cylindrical shape, and that the gas bag 4 of the former is supported at its open end, while the gas bag 4' of the latter is supported at its two open ends.

The accumulator of pot type consists of a liquid tank 1 and a gas bag 4, whose open end, being flanged, is cramped at the flange to the liquid tank 1 by a nut 2 through a lid 3 and a supporting ring 5, which is supported inside the liquid tank 1, thus composing a gas reservoir inside and a liquid reservoir outside the gas bag, as shown in the FIG. 1a and FIG. 1b. In the cylinder type, as shown in the FIG. 2a and FIG. 2b, the gas bag 4', whose both ends being open and flanged, is cramped at the flanges to the oil tank 1' by nuts 2 through a lid 3, a lid 3' and supporting rings 5, in the same way as the pot type. In the lid 3, a gas valve 6 is provided, through which the gas bag 4 or 4' is charged with gas. A valve cap 7 protects the gas valve.

An annular liquid channel 9 is grooved transversely on the inside wall of the liquid tank 1.. This channel 9 is connected to the pressure hydraulic system and measuring instruments including pressure gages through sockets 12, 12' and communicating passages 8, 8'. A liquid port ring 11 covers the liquid channel 9 to form a closed annular channel. The liquid port ring 11 has liquid ports 10 of a suitable number at an equal pitch, which connect the liquid channel 9 with the liquid reservoir.

When the accumulator, constructed as above described, is connected through the communicating passage 8' and the socket 12' to the pressure liquid pipe of a hydraulic system and through the communicating passage 8 and socket 12 directly to a pressure gage, then the pressure liquid of the hydraulic system is introduced into the liquid reservoir through the communicating passage 3', the liquid channel 9 and liquid ports 10, which are arranged face to face against the cylindrical wall of the gas bag 4 or 4' along its circumference. Thus any change in the hydraulic system acts directly and at the same time along its circumference, so that it takes no time for the gas bag to react sensitively and effectively against any pressure change induced in the pressure liquid system.

The gas bag 4 or 4', charged with gas to its standard pressure, contracts or expands according to the increase or decrease of the liquid pressure of the hydraulic system. When the liquid pressure is decreased, the gas bag expands to discharge liquid into the hydraulic system, until at last, the wall of the bag touches the wall of the liquid tank and closes the liquid ports 10. Thus the portions of the wall of the gas bag will close the liquid ports and serve as stop valves, mounted on the liquid port of conventional bladder type accumulators.

As the liquid pressure in the hydraulic system further drops, the gas bag will push the wall of the liquid tank, and consequently the bag will be pressed out into the liquid ports at the closing portions, where the gas bag may be spoiled and broken. To protect the bag against this trouble, a valve disc 13, which is large enough to cover and close the liquid port 10, is adhered on the surface of the gas bag at each closing portion.

The bag protection mechanism as above described may further be deviced, and in the following drawings, various possible embodiments are illustrated. The FIG. 3a and FIG. 3b up to the FIG. 8a and FIG. 8b are respectively the longitudinal and cross sections of devices.

(1) As shown in the FIG. 3a and 3b, instead of equipping a valve disc 13 on the surface of the gas bag 4 or 4', a ring of elastic plate 15 with tongues 14 and openings, cut open in the shape of a letter U at an equal pitch, is inserted into the port ring 11, so that the U tongues 14, which are bent inwards, may cover the liquid ports 10. By such arrangement, as long as the accumulator is in its normal condition, as shown in the drawings, the liquid ports 10 are opened into the oil tank through the U shape openings; when the gas bag 4 or 4' expands, its wall will at last touch the wall of the liquid tank 1 and push the tongues 14 to close the liquid ports 10, without being pinched and caught between the U shape tongues and openings.

(2) As shown in the FIG. 4a and 4b, the breadth of U shape tongues is made larger than that of the liquid channel 9. In this case, the ring 15 serves as the liquid port ring 11 as shown in the FIG. 3a and FIG. 3b, and the U shape openings serve as liquid ports.

(3) As shown in the FIG. 5a and FIG. 5b, by making the U shape tongues to a spoon shape, or as shown in the FIG. 6a and FIG. 6b, by lining the U shape tongues with flexible linings 16, the closing of the liquid port by the tongue 14 is secured more firmly than in the above two cases, and at the same time, the gas bag may be protected from being spoiled by the tongue.

(4) The FIG. 7a and FIG. 7b show the 4th embodiment, in which a valve belt 17 of elastic material is fixed at its centre on the liquid port ring 11, so that its both ends may slide on the inner surface of the liquid port ring 11, and that in the normal service condition of the accumulator, the liquid tank may be communicated through the liquid port 10 and the crescent shaped gap between this belt and the liquid port ring 11, and that when the gas bag expands, it will push the belt 17 outwards to close the liquid ports 10.

(5) In the above embodiment, the valve belt 17 is divided into two or more pieces 17, 17' etc., whose one end *a* is fixed to and the other end *b* slides on the inner surface of the liquid port plate 11.

Moreover in this case, holes 18 may be bored through the valve belt, so as not to face to the liquid ports 10, to minimize the flow resistance of fluid.

Thus, it has become clear by the above descriptions that the dull and inferior ability in absorbing hydraulic shocks, which is the major defect of the conventional bladder type accumulators, has been eliminated by this invention, and that the gas bag will be protected from injuries by the protecting devices of this invention, so that the accumulator of this invention can stand long successful services.

Moreover, it must be mentioned that in the conventional accumulators of bladder type, in which gages or other instruments are mounted on the wall of oil tank to measure hydraulic pressure, hydraulic communication between the gages and the hydraulic system is interrupted by the gas bag, after the bag expands and touches the inner wall of the liquid tank to close the liquid ports to the gage. But in the accumulator of this invention, gages or instruments are always communicated through the communicating passage 8, the liquid channel 9, the communicating passage 8' and then to a hydraulic system as already described. Therefore, gages or instruments will always indicate the stable normal pressure of hydraulic system.

I claim:

1. An accumulator comprising a liquid tank having end walls and a longitudinal side wall, a resiliently deformable bladder supported within the tank in spaced relation to the side wall, said longitudinal wall having an annular groove, an annular ring overlying said groove to form an annular channel therewith, liquid passages extending through the wall from the groove to the exterior of the tank, said ring having diammetrically opposite opening therethrough, and means for introducing gas under selected pressures in said bladder.

2. An accumulator as defined by claim 1 and a protective member between the bladder and said openings to prevent direct contact therebetween.

3. An accumulator as defined by claim 2 in which the protective member is carried by the bladder opposite each opening, said members being adapted to contact said openings upon abnormal expansion of the bladder.

4. An accumulator as defined by claim 2 in which the protective member comprises a band adjacent said annular ring, said band having resilient tongues extending inwardly adjacent said openings.

5. An accumulator as defined by claim 4 in which the tongues are in the general shape of a scroll.

6. An accumulator as defined by claim 5 in which the outer ends of the tongues have a concave curvature opposite the openings, respectively.

7. An accumulator as defined by claim 6 and a lining of flexible material at the ends of each of said fingers on the inner side thereof.

8. An accumulator as defined by claim 3 in which the protective members are in the shape of an open resilient ring of noncircular cross section.

9. An accumulator as defined by claim 2 in which the protective member comprises a pair of resilient arc-like members of noncircular curvature, said arc-like members having apertures therethrough displaced from alignment with said openings.

10. An accumulator as defined by claim 1 in which the openings in the annular ring are provided by forming tongues in the ring and bending them inwardly scroll-like, said tongues being adapted to close the opening when bent outwardly.

References Cited

UNITED STATES PATENTS

| | | | |
|---|---|---|---|
| Re. 24,390 | 11/1957 | Everett | 138—30 |
| 2,094,457 | 9/1937 | Lattner | 138—30 |
| 2,378,467 | 6/1945 | Dekiss | 138—30 |
| 2,933,148 | 4/1960 | Hendry | 138—26 |
| 3,165,166 | 1/1965 | Hall | 138—30 |

LAVERNE D. GEIGER, *Primary Examiner.*

BRADFORD KILE, *Assistant Examiner.*